(12) United States Patent
Chen et al.

(10) Patent No.: US 11,001,153 B2
(45) Date of Patent: May 11, 2021

(54) MODULARISED CHARGING VEHICLE

(71) Applicant: NIO CO., LTD., Shanghai (CN)

(72) Inventors: Jiong Chen, Shanghai (CN); Jianxing Zhang, Shanghai (CN); Xu He, Shanghai (CN); Honggang Xu, Shanghai (CN)

(73) Assignee: NIO CO., LTD., Shanghai (CN)

( * ) Notice: Subject to any disclaimer, the term of this patent is extended or adjusted under 35 U.S.C. 154(b) by 184 days.

(21) Appl. No.: 16/329,689

(22) PCT Filed: Aug. 23, 2017

(86) PCT No.: PCT/CN2017/098658
§ 371 (c)(1),
(2) Date: Feb. 28, 2019

(87) PCT Pub. No.: WO2018/040994
PCT Pub. Date: Mar. 8, 2018

(65) Prior Publication Data
US 2019/0193584 A1 Jun. 27, 2019

(30) Foreign Application Priority Data
Aug. 29, 2016 (CN) .......................... 201620974534.9

(51) Int. Cl.
*H02J 7/00* (2006.01)
*B60L 50/50* (2019.01)
(Continued)

(52) U.S. Cl.
CPC .............. *B60L 50/50* (2019.02); *B60L 53/20* (2019.02); *B60L 53/60* (2019.02); *B60L 53/67* (2019.02);
(Continued)

(58) Field of Classification Search
None
See application file for complete search history.

(56) References Cited

U.S. PATENT DOCUMENTS

2003/0030442 A1* 2/2003 Sugimoto ............... B60L 58/10
324/429
2003/0062874 A1* 4/2003 Furukawa ............. H02J 7/0016
320/121

(Continued)

FOREIGN PATENT DOCUMENTS

CN 102983614 3/2013
CN 203233188 10/2013
(Continued)

OTHER PUBLICATIONS

International Search Report prepared by the State Intellectual Property Office of the P.R. China dated Nov. 3, 2017, for International Application No. PCT/CN2017/098658.

*Primary Examiner* — Arun C Williams
(74) *Attorney, Agent, or Firm* — Sheridan Ross P.C.

(57) ABSTRACT

A modularised charging vehicle, aiming at solving the problem of repeated development caused by the fact that an existing charging vehicle needs to configure separate charging piles for various specifications of electric automobiles. A charging vehicle comprises a main controller and at least two charging and discharging modules, wherein the charging and discharging modules comprise a charging input end, a battery pack, a DC/DC converter and a charging output end. The battery pack is connected to the charging input end and the DC/DC converter. The DC/DC converter is connected to the charging output end. The charging and discharging modules are connected in parallel to each other, and are combined into one path for inputting and are combined into one path for outputting. The controller can control the charging and discharging modules to store and
(Continued)

US 11,001,153 B2

Page 2 release electric energy, so as to achieve an input or output function of different power.

16 Claims, 1 Drawing Sheet

(51) Int. Cl.
    *B60L 53/67* (2019.01)
    *B60L 53/60* (2019.01)
    *B60L 53/20* (2019.01)
    *B60L 58/24* (2019.01)

(52) U.S. Cl.
    CPC ............... *B60L 58/24* (2019.02); *H02J 7/00* (2013.01); *B60L 2210/10* (2013.01); *B60L 2210/30* (2013.01); *Y02T 10/70* (2013.01); *Y02T 10/72* (2013.01); *Y02T 10/92* (2013.01)

(56) References Cited

U.S. PATENT DOCUMENTS

| | | | | |
|---|---|---|---|---|
| 2003/0094923 A1* | 5/2003 | Emori | ................... | H02J 7/0021 320/126 |
| 2005/0121979 A1* | 6/2005 | Matsumoto | ......... | H01M 10/482 307/66 |
| 2005/0151509 A1* | 7/2005 | Cook | ................... | H02J 7/0018 320/116 |
| 2005/0206343 A1* | 9/2005 | Ichinose | ................... | H02J 9/08 320/126 |
| 2006/0164033 A1* | 7/2006 | Bolz | ..................... | H02J 7/1423 320/104 |
| 2006/0164034 A1* | 7/2006 | Hanyu | .................. | H02J 7/0024 320/104 |
| 2007/0284159 A1* | 12/2007 | Takami | ............... | H01M 2/1077 180/65.1 |
| 2008/0072859 A1* | 3/2008 | Esaka | .................. | H02J 7/0024 123/179.3 |
| 2008/0182143 A1* | 7/2008 | Dong | .................... | H01M 8/249 429/432 |
| 2009/0179616 A1* | 7/2009 | Ichikawa | ................ | B60L 50/16 320/134 |
| 2009/0195067 A1* | 8/2009 | Ichikawa | ................ | B60L 50/61 307/9.1 |
| 2010/0121511 A1* | 5/2010 | Onnerud | ................ | B60L 58/15 701/22 |
| 2010/0136449 A1* | 6/2010 | Yanase | ............. | H01M 8/04552 429/432 |
| 2011/0133559 A1* | 6/2011 | Yamashita | ................ | G06F 1/30 307/66 |
| 2012/0319657 A1* | 12/2012 | Ke | ........................ | H02J 7/0021 320/134 |
| 2015/0229132 A1 | 8/2015 | Katsunaga et al. | | |
| 2015/0302723 A1* | 10/2015 | Reade | .................. | H01M 10/44 340/636.1 |

FOREIGN PATENT DOCUMENTS

| | | |
|---|---|---|
| CN | 104065148 | 9/2014 |
| CN | 104517198 | 4/2015 |
| CN | 204361736 | 5/2015 |
| CN | 105835714 | 8/2016 |

* cited by examiner

MODULARISED CHARGING VEHICLE

CROSS REFERENCE TO RELATED APPLICATIONS

This application is a national stage application under 35 U.S.C. 371 and claims the benefit of PCT Application No. PCT/CN2017/098658 having an international filing date of 23 Aug. 2017, which designated the United States, which PCT application claimed the benefit of China Patent Application No. 201620974534.9 filed Aug. 29, 2016, the disclosure of each of which are incorporated herein by reference.

TECHNICAL FIELD

The invention relates to the field of electric vehicles and particularly provides a modularised charging vehicle.

BACKGROUND ART

With the rapid development and wide application of electric vehicles, people have put forward higher requirements for charging stations for electric vehicles. In order to facilitate charging of electric vehicles in different places, movable charging vehicles have been widely used as a supplement to charging stations. However, the current charging stations and movable charging vehicles need to provide individual charging piles for electric vehicles of different specifications to achieve the matching of input power and output power of the charging piles, leading to repeated developments of charging vehicles, which not only increases the research and development cycle of charging stations, but also increases the time for charging stations to be put on the market.

Accordingly, there is a need of a new movable charging vehicle in the art to solve the above problems.

SUMMARY OF THE INVENTION

In order to solve the above problems in the prior art, that is, to solve the problem of repeated development of the existing charging vehicles, the invention provides a modularised charging vehicle. The modularised charging vehicle comprises a main controller and at least two charging and discharging modules connected in parallel, wherein each of the charging and discharging modules comprises a charging input end, a battery pack, a DC/DC converter and a charging output end, the battery pack being connected to the charging input end and the DC/DC converter, and the DC/DC converter being connected to the charging output end; and the main controller is connected to the DC/DC converter of each of the charging and discharging modules to control the storage and release of electric energy by each of the charging and discharging modules in order for input or output of different powers.

In a preferred technical solution of the invention, the modularised charging vehicle further comprises an input switching module, which is installed between the charging input ends and the battery packs and connected to the main controller for combining a plurality of the charging input ends into one path.

In the preferred technical solution of the invention, the input switching module is provided with a plurality of contactors, the number of which is the same as that of the charging and discharging modules, the contactors being used for connecting the battery packs to the charging input ends.

In the preferred technical solution of the invention, the modularised charging vehicle further comprises at least two input controllers, the number of which corresponds to that of the charging and discharging modules, the input controllers being connected to the charging input ends and the battery packs respectively to control charging operations of the battery packs.

In the preferred technical solution of the invention, the modularised charging vehicle further comprises at least two output controllers, the number of which corresponds to that of the charging and discharging modules, the output controllers being connected to the DC/DC converters and the main controller to control discharging operations of the DC/DC converters.

In the preferred technical solution of the invention, the output controllers are further connected to the plurality of contactors arranged between the DC/DC converters and the charging output ends for controlling the contactors to enable or disable connections between the DC/DC converters and the charging output ends.

In the preferred technical solution of the invention, each of the charging input ends is provided with a DC charging pile.

In the preferred technical solution of the invention, the charging input ends are further provided with an AC charging pile, which is connected to the input switching module via an AC/DC converter.

In the preferred technical solution of the invention, the main controller is also connected to the AC/DC converter to control operations of the AC charging pile.

In the preferred technical solution of the invention, the modularised charging vehicle further comprises an AC input end, which is also connected to the input switching module via the AC/DC converter.

In the technical solution of the invention, the plurality of charging and discharging modules are controlled by the main controller for the release and storage of electric energy, specifically, via the input switching module, the input controllers and the output controllers, the main controller realizes separate charging and discharging and any combination of parallel charging and discharging among the battery packs, such that the modularised charging vehicle can input or output different powers.

DETAILED DESCRIPTION OF EMBODIMENTS

Preferred embodiments of the invention are described below with reference to the accompanying drawings. It should be understood by those skilled in the art that these embodiments are only for explaining the technical principles of the invention and are not intended to limit the scope of protection of the invention. Those skilled in the art can make amendments according to requirements so as to adapt to specific application scenarios.

Figure 1:
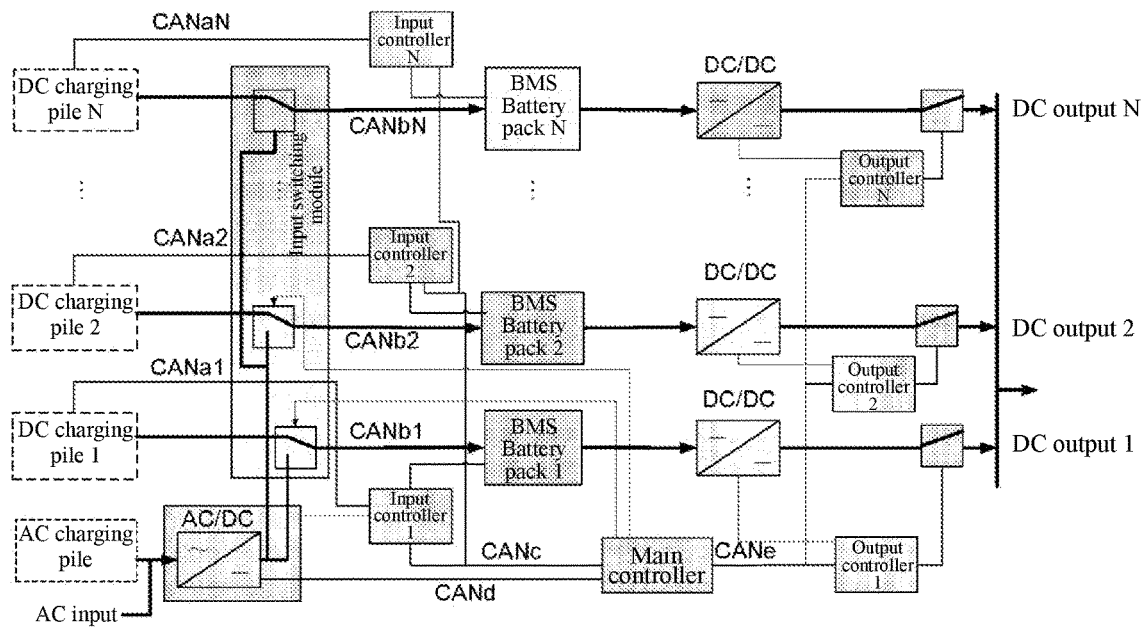
FIG. 1 is the overall system block diagram of the invention.
Figure 2:
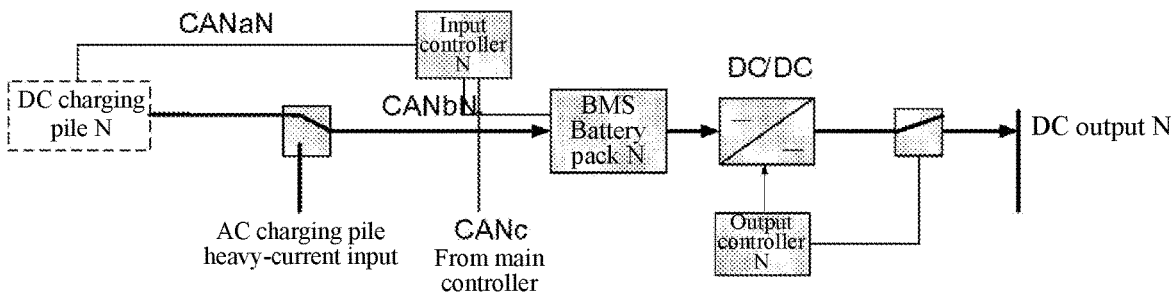
FIG. 2 is a block diagram of a single charging and discharging module of the invention.

As shown in FIGS. 1 and 2, the overall modularised movable charging vehicle system comprises a main controller, an AC/DC converter, an input switching module, input controllers, output controllers and a plurality of charging and discharging modules, and each of the charging and discharging modules can complete the release and storage of electric energy separately.

As shown in FIG. 2, each of the charging and discharging modules mainly comprises a charging input end (which is located at the left of the input switching module in FIG. 2), a battery pack, a DC/DC converter and a charging output end (which is located at the right of the DC/DC converter in FIG. 2). The charging input end, the battery pack, the DC/DC converter and the charging output end are connected sequentially from left to right as shown in FIG. 2, wherein the input controller is arranged between the charging input end and the battery pack, and one end of the input controller is connected to the battery pack and the other end of the input controller is connected to a DC charging pile of the charging input end, and the input controller can feed back information about the battery pack, such as the temperature, the battery level and the charging time, to the main controller and the DC charging pile of the charging input end, in order to control a charging operation of the battery pack.

It should be noted that the charging input end and the charging output end are not specific to a certain device or component, but the charging input end and the charging output end here refer to a charging connection end and a discharging connection end of the battery pack in a general sense.

Continuing to refer to FIG. 2, the charging input end is electrically connected to the DC charging pile, so that the DC charging pile can charge the battery pack. The DC/DC converter can convert a DC voltage provided by the positive and negative terminals of the battery pack into a DC voltage meeting the need of an electric vehicle, and can further connect the charging output end to a charging port of the electric vehicle so as to charge the electric vehicle. When the battery level of the battery pack is too low, the input controller will feed back information about the battery level of the battery pack to the main controller, thus stopping charging the electric vehicle. When the battery pack is charged, the input controller will feed back a real-time battery level of the battery pack to the main controller and the DC charging pile, and when the battery pack is fully charged, the main controller will instruct the input controller to stop the DC charging pile from supplying power to the battery.

Continuing to refer to FIG. 1, the input switching module comprises a plurality of contactors. The charging input end and the battery pack are electrically connected via the contactor, and the contactor is further provided with another input end through which the battery pack can be connected to an AC charging pile or a charging pile of another charging power, so as to meet the requirement of the battery pack for different input powers. As mentioned above, in addition to being connected to the charging input end and the battery pack, the input controller is connected to the main controller. Moreover, CANaN is a transmission signal between the input controller N and the DC charging pile, CANbN is a transmission signal between the input controller N and the battery pack, and CANcN is a transmission signal between the input controller N and the main controller. A current output end of each of the DC/DC converters is also provided with a contactor, which is respectively connected to each of the output controllers, so that each of the output controllers can independently control the turning on/off of the contactor. Based on this, the charging and discharging module can be extended via the main controller in combination with corresponding hardware interfaces and communication protocols.

As shown in FIG. 1, the contactors on the charging and discharging modules, which connect the charging input ends and the battery packs, are all arranged on the input switching module, and the AC/DC converter can enable the AC charging pile to charge the battery in each of the charging and discharging modules, thereby meeting the emergency requirements in case of long-time slow charging input and failure to find a DC pile. All the contactors are respectively connected to a current output end of the AC/DC converter, the contactors at the current output ends of the DC/DC converters are all connected to the output controllers, so that the output controllers can control the turning on/off of these contactors, and a power output line at the other end of each of the contactors is finally connected to a general power output line, so that the charging and discharging modules can provide parallel outputs for charging various types of electric vehicles.

Continuing to refer to FIG. 1, on one hand, the main controller is respectively connected to the input controller of each charging and discharging module for monitoring and controlling each single battery pack; on the other hand, the main controller is respectively connected to the contactors on the input switching module to control the turning on/off of each of the contactors and combine multiple inputs into one path so as to adapt to different input power conditions and realize charging of an energy-storage battery in the mobile charging vehicle at different charging rates; furthermore, the main controller is connected to the output controllers, and by controlling the control output controllers to switch the contactors at the current output ends of the DC/DC converters, multiple outputs can be combined into one path, so as to adapt to different output power requirements and realize charging of external vehicles at different charging rates; in addition, the main controller is connected to the AC/DC converter for feeding back data of the relevant battery pack, such as the voltage, the current, the temperature, and the battery level, to the AC charging pile in the case of AC slow charging, so as to control the operations of the AC charging pile or the AC/DC converter.

In summary, when charging the charging vehicle, by using the DC charging pile of each charging and discharging module, the corresponding battery pack can be charged respectively; alternatively, the contactors on the input switching module can be controlled by the main controller to combine multiple inputs into one path for centralized charging of a certain battery pack in the charging vehicle; and when there is no DC charging pile, the battery pack in each charging and discharging module can be charged by the AC/DC converter. When the charging vehicle is charging an electric vehicle, the main controller will send information to the output controllers according to the electric vehicle of different specifications, and the output controllers control the contactors at the current output ends of the DC/DC converters to combine multiple outputs into one path for charging the electric vehicle.

Heretofore, the technical solutions of the invention have been described with reference to the preferred embodiments shown in the accompanying drawings; however, those skilled in the art can readily understand that the protection scope of the invention is obviously not limited to these particular embodiments. Without departing from the principle of the invention, a person skilled in the art may make equivalent modifications or substitutions to related technical features, and the technical solutions after these modifications or substitutions shall fall within the scope of protection of the invention.

What is claimed is:

1. A modularised charging vehicle, comprising a main controller and at least two charging and discharging modules connected in parallel, wherein
   each of the charging and discharging modules comprises a charging input end, a battery pack, a DC/DC converter and a charging output end, the battery pack being connected to the charging input end and the DC/DC converter, and the DC/DC converter being connected to the charging output end, and
   the main controller is connected to the DC/DC converter of each of the charging and discharging modules to control the storage and release of electric energy by each of the charging and discharging modules, in order for input or output of different powers;
   wherein the modularised charging vehicle further comprises an input switching module, which is installed between the charging input ends and the battery packs and connected to the main controller for combining a plurality of the charging input ends into one path.

2. The modularised charging vehicle according to claim 1, wherein the input switching module is provided with a plurality of contactors, the number of which is the same as that of the charging and discharging modules, the contactors being used for connecting the battery packs to the charging input ends.

3. The modularised charging vehicle according to claim 2, wherein the modularised charging vehicle further comprises at least two input controllers, the number of which corresponds to that of the charging and discharging modules, the input controllers being connected to the charging input ends and the battery packs respectively to control charging operations of the battery packs.

4. The modularised charging vehicle according to claim 3, wherein each of the input controllers is further connected to the main controller, and the input controller is able to feed back the temperature, the battery level, and the charging time of the corresponding battery pack to the main controller and the charging input end, in order to control the charging operation of the battery pack.

5. The modularised charging vehicle according to claim 3, wherein the modularised charging vehicle further comprises at least two output controllers, the number of which corresponds to that of the charging and discharging modules, the output controllers being connected to the DC/DC converters and the main controller to control discharging operations of the DC/DC converters.

6. The modularised charging vehicle according to claim 5, wherein the output controllers are further connected to a plurality of contactors arranged between the DC/DC converters and the charging output ends for controlling the contactors to enable or disable connections between the DC/DC converters and the charging output ends.

7. The modularised charging vehicle according to claim 1, wherein each of the charging input end is provided with a DC charging pile.

8. The modularised charging vehicle according to claim 7, wherein the charging input ends are further provided with an AC charging pile, which is connected to the input switching module via an AC/DC converter.

9. The modularised charging vehicle according to claim 8, wherein the main controller is also connected to the AC/DC converter to control operations of the AC charging pile.

10. The modularised charging vehicle according to claim 9, wherein the modularised charging vehicle further comprises an AC input end, which is also connected to the input switching module via the AC/DC converter.

11. The modularised charging vehicle according to claim 1, wherein each of the charging input end is provided with a DC charging pile.

12. The modularised charging vehicle according to claim 2, wherein each of the charging input end is provided with a DC charging pile.

13. The modularised charging vehicle according to claim 3, wherein each of the charging input end is provided with a DC charging pile.

14. The modularised charging vehicle according to claim 4, wherein each of the charging input end is provided with a DC charging pile.

15. The modularised charging vehicle according to claim 5, wherein each of the charging input end is provided with a DC charging pile.

16. The modularised charging vehicle according to claim 6, wherein each of the charging input end is provided with a DC charging pile.

* * * * *